(12) United States Patent
Herinckx et al.

(10) Patent No.: US 9,434,503 B2
(45) Date of Patent: Sep. 6, 2016

(54) PACKAGING FOR A WIPER BLADE

(71) Applicant: Robert Bosch GmbH, Stuttgart (DE)

(72) Inventors: Dirk Herinckx, Dries-Linter (BE); Pieter Casteleyn, Wilsele (BE); Ruediger Renner, Pfinztal-Berghausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/411,449

(22) PCT Filed: Jun. 17, 2013

(86) PCT No.: PCT/EP2013/062535
§ 371 (c)(1),
(2) Date: Dec. 26, 2014

(87) PCT Pub. No.: WO2014/001130
PCT Pub. Date: Jan. 3, 2014

(65) Prior Publication Data
US 2015/0158626 A1    Jun. 11, 2015

(30) Foreign Application Priority Data
Jun. 26, 2012 (DE) .................. 10 2012 210 885

(51) Int. Cl.
*B65D 5/50*   (2006.01)
*B65D 77/04*  (2006.01)
(Continued)

(52) U.S. Cl.
CPC .......... *B65D 5/5076* (2013.01); *B60S 1/3848* (2013.01); *B65D 5/38* (2013.01); *B65D 5/445* (2013.01);
(Continued)

(58) Field of Classification Search
CPC ...... B60S 1/3848; B60S 1/38; B65D 5/5076; B65D 5/445; B65D 77/26; B65D 85/68
USPC ......... 206/335, 468; 229/112, 111, 113, 116, 229/115
See application file for complete search history.

(56) References Cited

U.S. PATENT DOCUMENTS 2,026,626 A * 1/1936 Gilfillan ................ B65D 75/28
206/489
4,239,104 A * 12/1980 Roccaforte ............ B65D 65/12
206/335

(Continued)

FOREIGN PATENT DOCUMENTS

CN    201745918 U    2/2011
DE    29716702       1/1998

(Continued)

OTHER PUBLICATIONS

International Search Report for Application No. PCT/EP2013/062535 dated Sep. 16, 2013 (English Translation, 3 pages).

*Primary Examiner* — Steven A. Reynolds
(74) *Attorney, Agent, or Firm* — Michael Best & Friedrich LLP

(57) ABSTRACT

A packaging for a wiper blade includes a cuboidal folding box and an intermediate packaging for receiving the wiper blade and to be received in the folding box. The intermediate packaging can be produced by folding a planar material and has two parallel longitudinal sides for abutment against inner sides of the folding box. The intermediate packaging further includes lateral support devices to prevent the wiper blade from tipping over in the intermediate packaging.

22 Claims, 6 Drawing Sheets

(51) Int. Cl.
  *B65D 5/38* (2006.01)
  *B65D 5/44* (2006.01)
  *B65D 77/26* (2006.01)
  *B60S 1/38* (2006.01)

(52) U.S. Cl.
  CPC ........... *B65D 5/5007* (2013.01); *B65D 5/5011* (2013.01); *B65D 5/5016* (2013.01); *B65D 77/042* (2013.01); *B65D 77/26* (2013.01); *B60S 2001/3898* (2013.01); *B65D 2577/043* (2013.01); *B65D 2585/6885* (2013.01)

(56) References Cited

U.S. PATENT DOCUMENTS

| | | | | |
|---|---|---|---|---|
| 4,895,255 | A | * | 1/1990 | Fisher ................... B65D 71/10 206/461 |
| 5,027,947 | A | * | 7/1991 | Reighart ................ B65D 11/12 206/335 |
| D327,013 | S | * | 6/1992 | Reighart ........................ D9/415 |
| 5,769,228 | A | * | 6/1998 | Wroblewski ........... B65D 75/36 206/461 |
| 6,168,020 | B1 | * | 1/2001 | Niedzwiedz ....... B65D 77/0453 206/335 |
| 6,779,661 | B1 | * | 8/2004 | Kotlarski ............... B60S 1/3879 206/335 |
| 2006/0163096 | A1 | * | 7/2006 | Reiber .................. B60S 1/3848 206/349 |
| 2006/0213799 | A1 | * | 9/2006 | Muller ..................... B65D 5/38 206/469 |
| 2008/0073246 | A1 | | 3/2008 | Herring et al. |
| 2012/0043237 | A1 | | 2/2012 | Hun et al. |

FOREIGN PATENT DOCUMENTS

| | | |
|---|---|---|
| DE | 19634683 | 3/1998 |
| FR | 2287393 | 5/1976 |
| FR | 2684958 | 6/1993 |
| FR | 2902413 | 12/2007 |
| JP | S53126828 A | 11/1978 |
| JP | S63171331 A | 7/1988 |
| JP | H01170612 A | 7/1989 |
| JP | 2001206473 A | 7/2001 |

\* cited by examiner

PACKAGING FOR A WIPER BLADE

BACKGROUND OF THE INVENTION

The invention relates to a packaging for a wiper blade.

A wiper blade for a wiper system of a motor vehicle represents a part subject to wear that should be regularly replaced. Due to the varying dimensions of popular motor vehicles and different wiper systems installed thereon, a wide variety of different wiper blades exists, from which a suitable one must be selected when replacing wiper blades. In order for consistently high-quality wiper blades to be sufficiently available at a retail outlet for wiper blades, for example a gas station, a specialty department in a home improvement center or at a motor vehicle service location, it is necessary to package the wiper blade such that it is well protected during transport and storage. Furthermore, a large number of packaged wiper blades should be systematically stackable in order to facilitate the storage and transport thereof. Finally, it is advantageous for an individually packaged wiper blade and wiper blades packaged in pairs to be packaged in similar packagings or in packagings that are compatible with each other. The packaging should reliably protect the wiper blade even in the case of long storage periods. An unarticulated wiper blade should particularly be supported by the packaging such that damage caused by storage is prevented to the greatest possible extent.

SUMMARY OF THE INVENTION

An inventive packaging for a wiper blade comprises a cuboidal folding box and an intermediate packaging for receiving the wiper blade and to be received in the folding box. The intermediate packaging can be produced by folding a planar material and has two parallel longitudinal sides for abutment against inner sides of the folding box. The intermediate packaging further comprises lateral support devices to prevent the wiper blade from tipping over in the intermediate packaging.

By use of the intermediate packaging, it is possible to package wiper blades in a similar manner which vary with regard to the length, height or width thereof within the scope of a product range; thus enabling on the one hand the packaged wiper blade to be optimally protected and on the other hand a plurality of packaged wiper blades to be arranged or handled in a similar manner. Storage, transport and a presentation for the purpose of selection or, respectively, sale of the wiper blades can thereby be facilitated.

In one embodiment, the intermediate packaging comprises a V-shaped cross section. The two flanks of the V-shape can thus fit snugly to the sides of the wiper blade and laterally support the wiper blade in a simple and effective manner. An insertion of the wiper blade at the side of the V-shaped cross section that is open at the top can be facilitated.

In a further embodiment, the intermediate packaging is open on one longitudinal side and comprises a package band surrounding the cross section. Like the intermediate packaging, the package band can preferably be manufactured from a planar, foldable material, in particular paper, cardboard or a corresponding derivative. An automated fixing of the wiper blade in the intermediate packaging can thereby be facilitated. The wiper blade can furthermore be presented in a particularly high quality manner while the intermediate packaging comprising the wiper blade is being removed from the folding box.

In one embodiment, the intermediate packaging comprises a first element having a U-shaped cross section and a second element, the cross section of which comprises alternately vertical and horizontal sections and which is symmetrical with respect to a central section, which abuts against the first element between the two flanks thereof. This embodiment can particularly be used in combination with the aforementioned embodiment. As an alternative thereto, the first element can comprise an additional section, by means of which the first element can be closed on the longitudinal side. A protection of the wiper blade accommodated in the intermediate packaging can thereby be further increased.

In still another embodiment, the cross section of the intermediate packaging comprises an M-shaped bottom section. The lateral supporting effect can be implemented in a simple and reliable manner by means of the M-shaped bottom section. Additional sections of the intermediate packaging can be placed in a stepped manner around the wiper blade in order to give the cross section a square exterior.

In still another embodiment, the intermediate packaging comprises prism-shaped contact faces for the ends of the wiper blade, wherein the contact faces respectively comprise a V-shaped notch for engaging the wiper blade. The prism-shaped contact faces can be easily produced by folding the material of the intermediate packaging in the transverse direction. The notches can be easily adapted to different wiper blades.

The intermediate packaging can be of U-shaped design by means of two folds in the longitudinal direction, and angular support elements can be folded in each case towards the inside in the region of the folds. The support elements can be easily adapted to different wiper blades. In addition, the intermediate packaging can be folded in this way from a rectangular source material without any waste being produced.

In a preferred embodiment, the intermediate packaging is set up to receive the wiper blade on one longitudinal side. In particular, the wiper blade can be inserted from the top into the intermediate packaging. An automated production and packaging of the wiper blade can thereby be facilitated.

In still another preferred embodiment, the folding box is configured to receive two intermediate packagings. As a result, wiper blades that are required in pairs for a motor vehicle can be more easily logistically managed. An additional folding box for receiving only one intermediate packaging can be formed such that said box is as high as the first folding box is wide.

BRIEF DESCRIPTION OF THE DRAWINGS

The invention is now described in more detail with reference to the attached figures, in which.

DETAILED DESCRIPTION

Six different embodiments of packagings for a wiper blade or a pair of wiper blades are described below in more detail. Each packaging has a corresponding method for producing the intermediate packaging from a planar, foldable material, for inserting the wiper blade into the intermediate packaging and for packing the intermediate packaging including the wiper blade into a folding box. In the following figures, the embodiments are in each case depicted on the left side; and the methods are schematically depicted on the right side. The arrangements of views of the embodiments are for the most part the same in all of the figures.

Features of intermediate packagings of different embodiments can generally be combined with each other. The associated procedural steps must then be suitably adapted in certain circumstances, as a person skilled in the art can readily discern from the following explanations.

Figure 1:
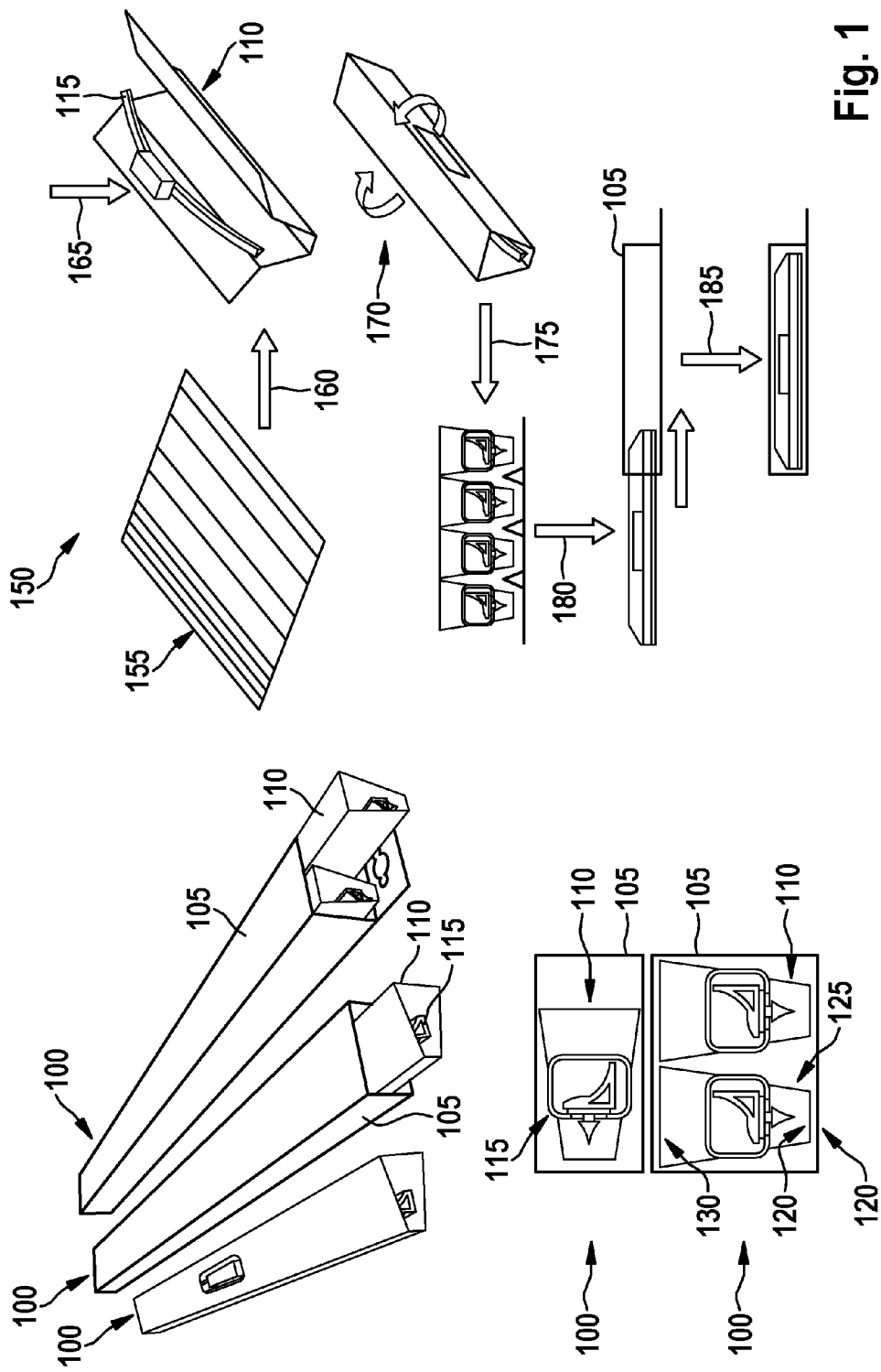
FIG. 1 shows a packaging for a wiper blade and a packaging method in a first embodiment.

FIG. 1 shows on the left-hand side a packaging 100 for a wiper blade in a first embodiment. The packaging 100 comprises a cuboidal folding box 105 and an intermediate packaging 110. The folding box 105 can be produced according to any desired method and can be imprinted or otherwise labeled as to the content thereof. The intermediate packaging 110 is configured to receive a wiper blade 115 and to be received together with the wiper blade 115 in the folding box 105. In an upper region of FIG. 1, the intermediate packaging 110 comprising the wiper blade 115, a first folding box 105 comprising an intermediate packaging 110 and a wiper blade 115 as well as a second folding box 105 comprising two intermediate packagings 110 and two wiper blades 115 are depicted from left to right. In a lower section of the figure, cross sections of the first folding box 105 and the second folding box 105 comprising the intermediate packagings 110 and the wiper blades 115 are depicted. The cross section of the wiper blade 115 is thereby only symbolically represented.

The intermediate packaging has a cross section which is V-shaped or, in the depicted embodiment having a capped apex, trapezoidal. A respective side section 125 is disposed at both sides of a bottom section of the intermediate packaging 110. One or preferably both of the side sections 125 are folded in the extensions thereof as cover sections 130 parallel to the bottom section 120. As a result, the adjacent cover sections 130 can be adhesively bonded to one another over a large area.

FIG. 1 shows on the right-hand side a method 150 for packaging the wiper blade 115 in the packaging 100. A planar, foldable material, which is referred to as plano, serves as source material. The plano can particularly consist of pasteboard, cardboard, paper, cellulose or plastic. The plano 155 is preferably folded at predetermined locations in order to subsequently be more easily bendable there.

In a first step 160, the plano 155 is brought into the V-form or into the form of a flattened prism. In step 165, the wiper blade 115 is subsequently inserted into the intermediate packaging 110 that is still open at the top.

In a following step 170, the cover sections 130 of the intermediate packaging 110 are folded towards the inside so that they abut against one another. The two cover sections 130 are then preferably bonded to one another using an adhesive.

In an optional step 175, a plurality of intermediate packagings 110 comprising inserted wiper blades 115 is collected. The collecting of the intermediate packagings 110 can particularly comprise providing said intermediate packagings 110 on a tray or in a queue of a production line.

The intermediate packaging 110 comprising the wiper blade 115 is subsequently introduced into one of the folding boxes 180. In so doing, said intermediate packagings are preferably introduced from a front face. If the folding box 105 is set up to receive a plurality of intermediate packagings 110, the additional intermediate packagings are thus also introduced into the folding box 105. The pre-packaged wiper blade 115 is subsequently provided in step 185.

Figure 2:
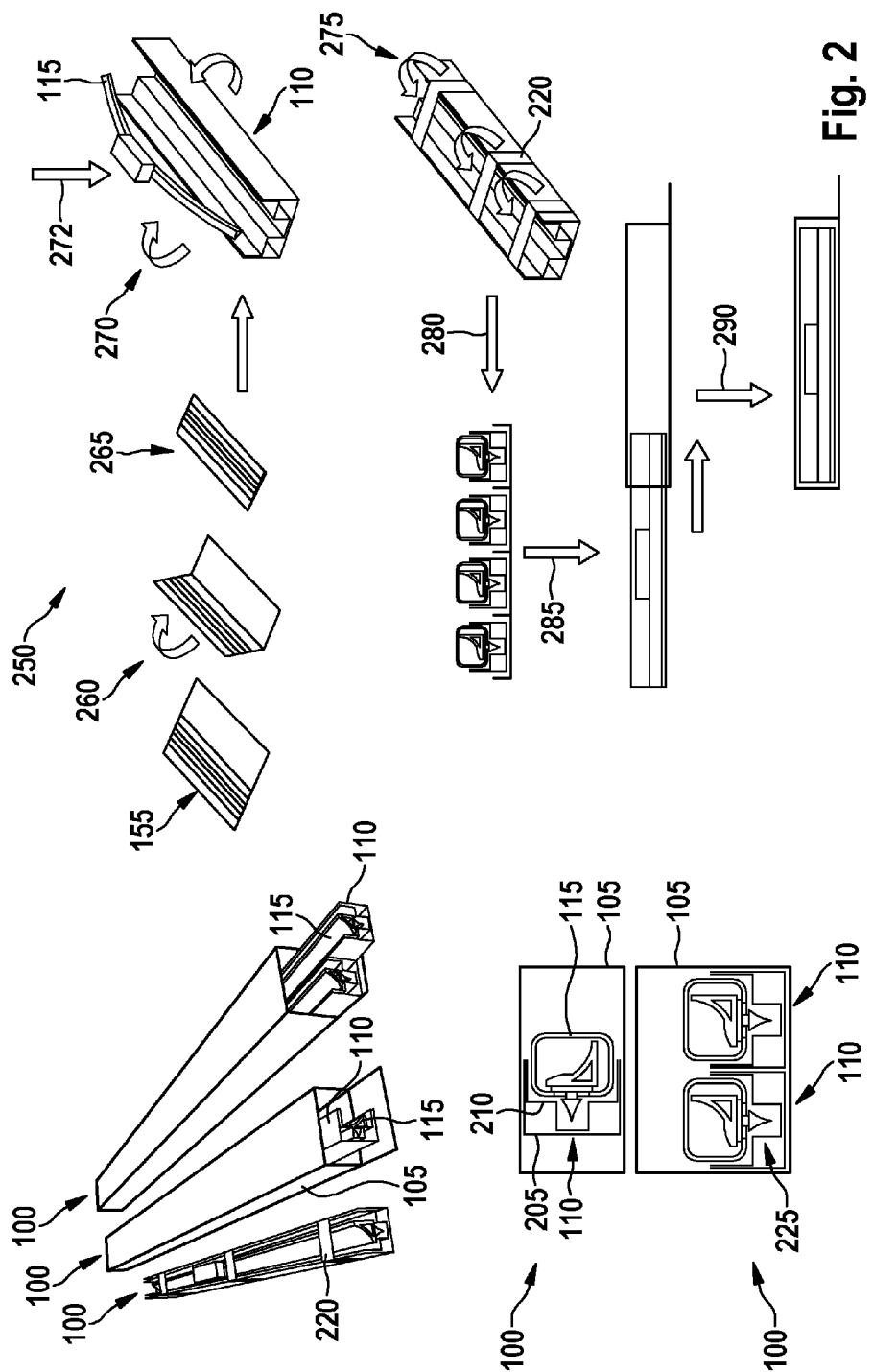
FIG. 2 shows a packaging for a wiper blade and a packaging method in a second embodiment.

FIG. 2 shows a packaging 100 and a method 250 for packaging a wiper blade 115 in the packaging 100 according to a second embodiment. In the embodiment shown, the intermediate packaging 110 comprises a first element 205 and a second element 210. The first element 205 has a U-shaped cross section, wherein only two folds preferably run in the longitudinal direction. The second element 210 has a cross section which comprises alternately vertical and horizontal sections that are symmetrically disposed with respect to a center section. The center section preferably abuts against the center section of the first element 205. The outermost vertical sections of the second element 210 preferably abut against the inner sides of the side sections of the first element 205.

In a further embodiment, the first element 205 and the second element 210 can be integrally connected to one another. In the cross section depicted, the ends of the integral material for the intermediate packaging 110 can meet at a joint 215. The joint is preferably disposed in a region, whereat a fold or bend would otherwise lie.

The method 250 is again based on a planer material 155 which is folded in a first step 260 and is partially adhesively bonded in a following step 265. These steps can be carried out so as to be integrated with each other. The folded and partially bonded plano 155 is subsequently still present in planar form.

In a following step 270, the intermediate packaging 110 is folded opened, whereby a protrusion results 225. The wiper blade 115 is subsequently inserted from above into the intermediate packaging 110 in step 272 so that the wiper blade 115 is laterally supported by the protrusion 225.

In a following step 275, one or a plurality of package bands 220 is attached to the intermediate packaging 110 such that said package bands surround the intermediate packaging in the transverse direction. The package bands 220 prevent the wiper blade 115 from falling out of the intermediate packaging and ensure a stable form of said intermediate packaging 110.

The following steps 280, 285, and 290 correspond to the steps 175, 180 and 185 from FIG. 1.

Figure 3:
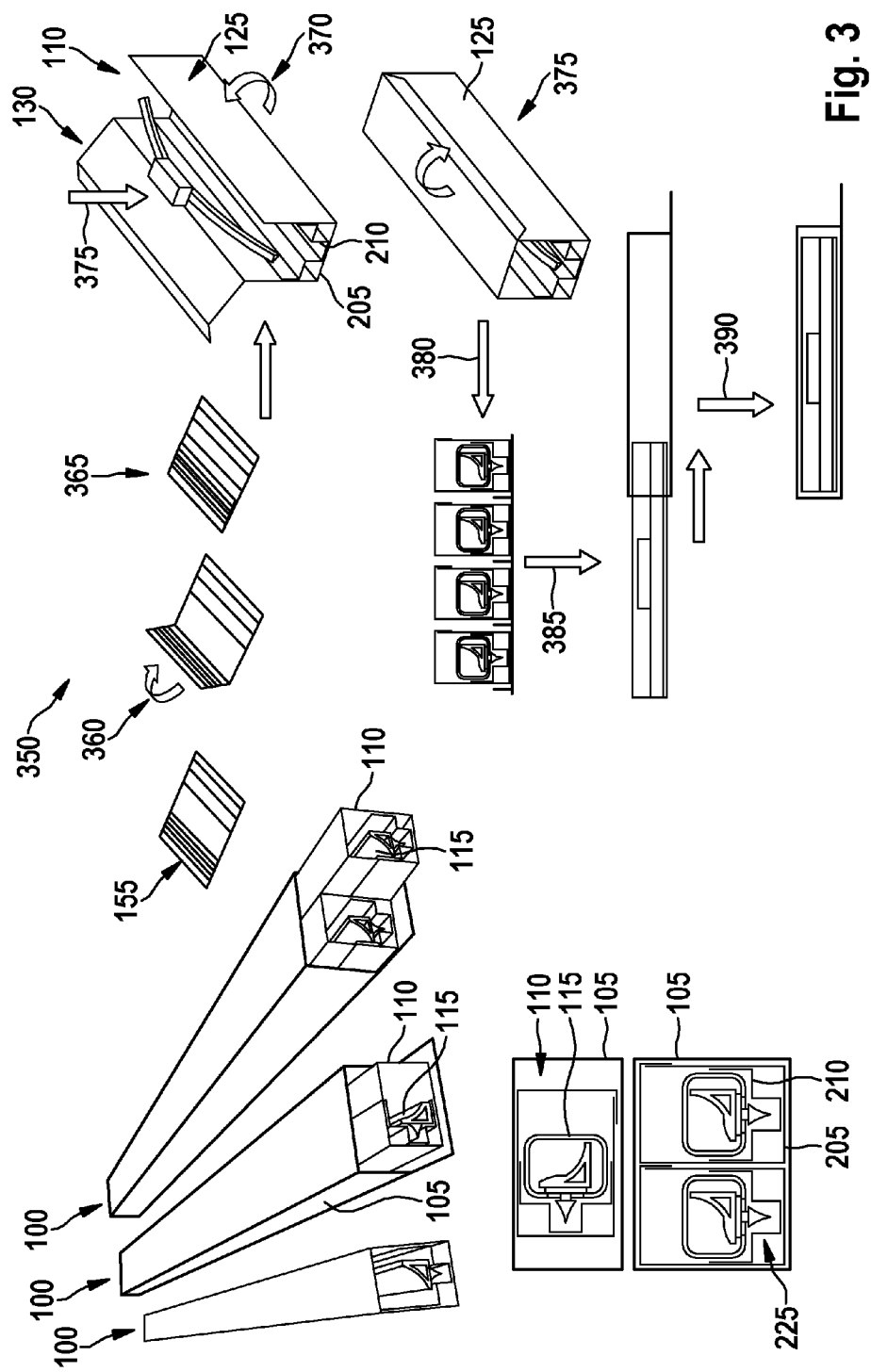
FIG. 3 shows a packaging for a wiper blade and a packaging method in a third embodiment.

FIG. 3 shows a packaging 100 and a method 350 for packaging a wiper blade 115 in the packaging 100 according to a third embodiment. The depicted embodiment differs from the embodiment depicted in FIG. 2 by the fact that no package bands 220 are used to close the intermediate packaging 110 on the top side, but rather the first element 205 comprises a cover section 130 with which the top side of the intermediate packaging 110 can be closed. In a preferred embodiment, the cover section 130 comprises a tab for bonding to the side section 125 of the first element 205.

In this case, the first element 205 and the second element 210 can also be integrally embodied. Ends of the material of the intermediate packaging 110 do not then typically lie adjacent to one another and therefore do not form a junction 215.

The steps 360 to 390 of the method 350 correspond accordingly to the steps 260 to 290 of the method 250 from FIG. 2 with the exception of step 375 in which no packaging bands are attached but rather the cover section 130 of the first element 205 is folded over the upper opening of the intermediate packaging 110. The cover section 130 preferably comprises a tab which can be adhesively bonded to the corresponding side section 125 in the same step.

Figure 4:
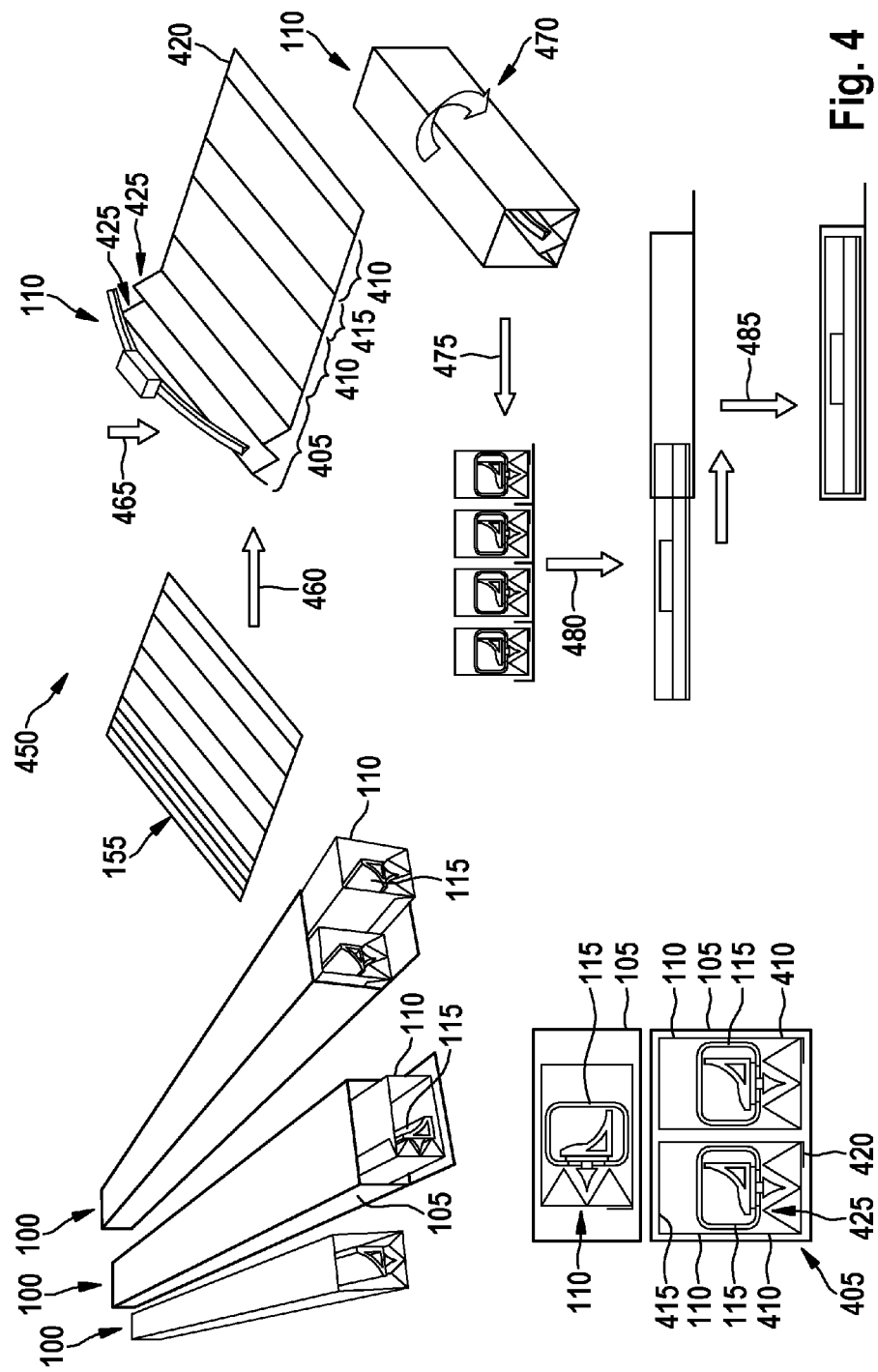
FIG. 4 shows a packaging for a wiper blade and a packaging method in a fourth embodiment.

FIG. 4 shows a further packaging 100 and a method for packaging a wiper blade 115 in the packaging 100 according to a fourth embodiment.

The cross section of the intermediate packaging 110 comprises a bottom section 405 which is adjoined by two side sections 410 which in turn are connected to one another by means of a cover section 415. One of the side sections 410 preferably comprises a tab for bonding to the intermediate packaging 110.

The bottom section 405 is folded in the shape of an M in the cross section of the intermediate packaging 110 so that two prism-shaped protrusions 425 result, between which the narrow side of the wiper blade 115 can lie. One side of the bottom section 405 runs in the horizontal direction back to the opposite end and merges in a 90° bend into a first side section 410. At a further bend, the side section 410 merges into a cover section 415 which in turn becomes a side section 410 via a further bend. The tab 420 is connected to said side section 410 by means of a further bend.

The method 450 begins with step 460, in which the bottom section 405 is folded in the shape of an M. The wiper blade 110 is subsequently inserted from above between the two protrusions 425 of the bottom section 405 in step 465.

In a subsequent step 470, the remaining sections of the plano 155 are folded around the wiper blade 110 such that the cross section is closed and the tab 420 abuts against the bottom section 405. The tab 420 is then preferably adhesively bonded to the bottom section 405. The steps 475, 480 and 485 correspond to the steps 380 to 390 of the method 350 in FIG. 3.

Figure 5:
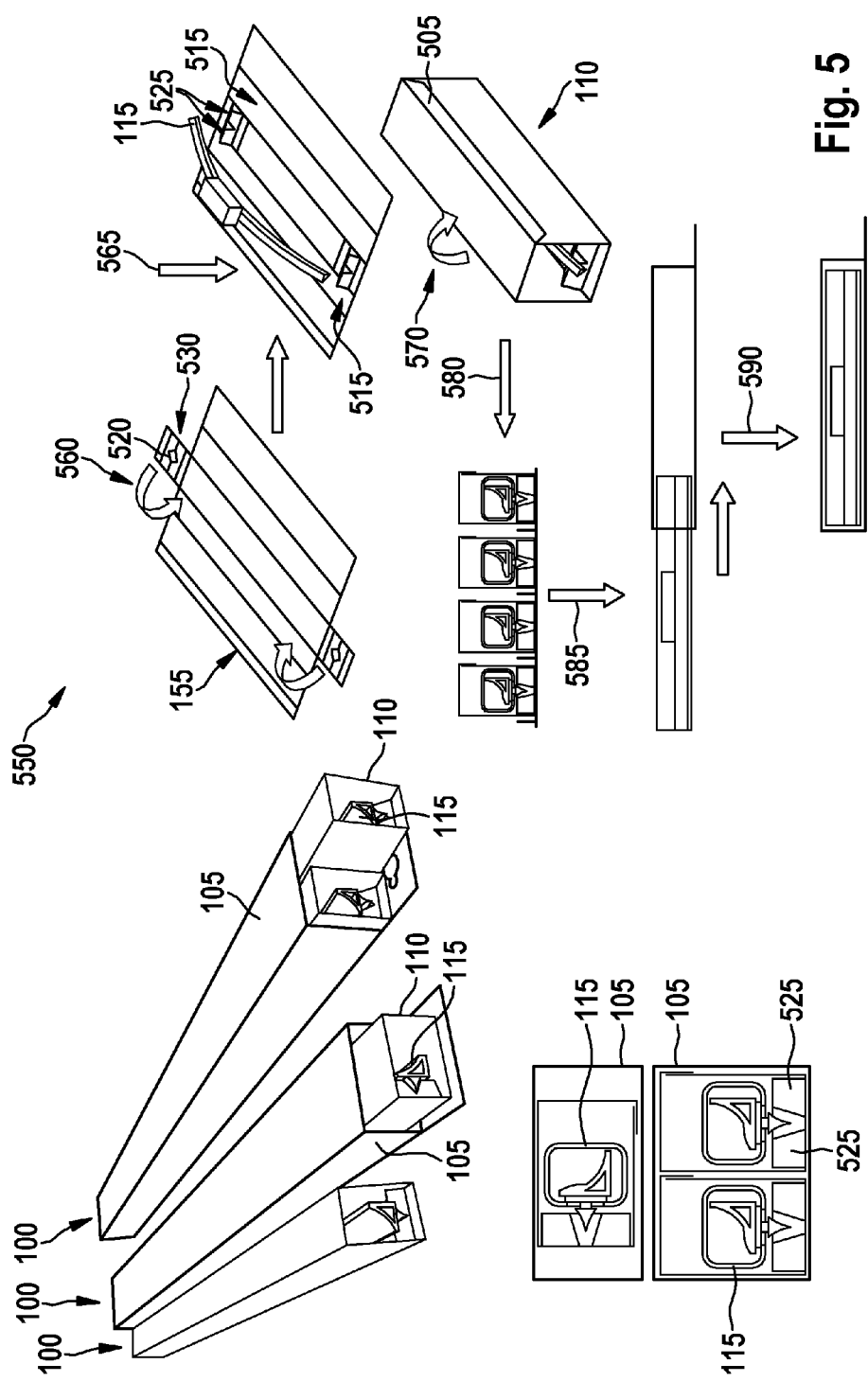
FIG. 5 shows a packaging for a wiper blade and a packaging method in a fifth embodiment.

FIG. 5 shows a packaging 100 and a method 550 for packaging a wiper blade 115 in the packaging 100 according to a fifth embodiment.

The present embodiment is characterized by the fact that the material of the intermediate packaging 110 in cross section passes once around the circumference of the wiper blade 115, a tab 505 being provided for the purpose of overlap and optionally of adhesively bonding. In the region of the ends of the wiper blade 115, a section 510 of the plano 155 is in each case folded inwards in the longitudinal direction such that transverse, prism-shaped contact faces 515 result. A notch 520, in which a narrow section of the wiper blade can be accommodated, is introduced in each case into the contact face 515. The contact face 515 is divided into two support elements 525 by means of the notch 520.

The method 550 is based on a plano 155 which deviates from the rectangular form as a result of two initially protruding sections 530 being provided, which are folded lengthwise in a first step 560 in order to form the prism-shaped contact faces 515. The notches are preferably introduced as a recess in the plano 155 already prior to the folding in step 560.

In step 565, the wiper blade 515 is inserted from above into the notches 520 such that the wiper blade 115 is supported at the support elements 525. In a subsequent step 570, remaining sections of the plano 155 are folded around the wiper blade 115 so that a cross section of the intermediate packaging 110 is closed. In order to facilitate this folding process, different positions of the sections 530 on the plano 155 are possible.

At the same time, the intermediate packaging 110 is preferably adhesively bonded in the region of the tab 505. The subsequent steps 580, 585 and 590 correspond to the steps 475, 480 and 485 of the method 450 from FIG. 4.

Figure 6:
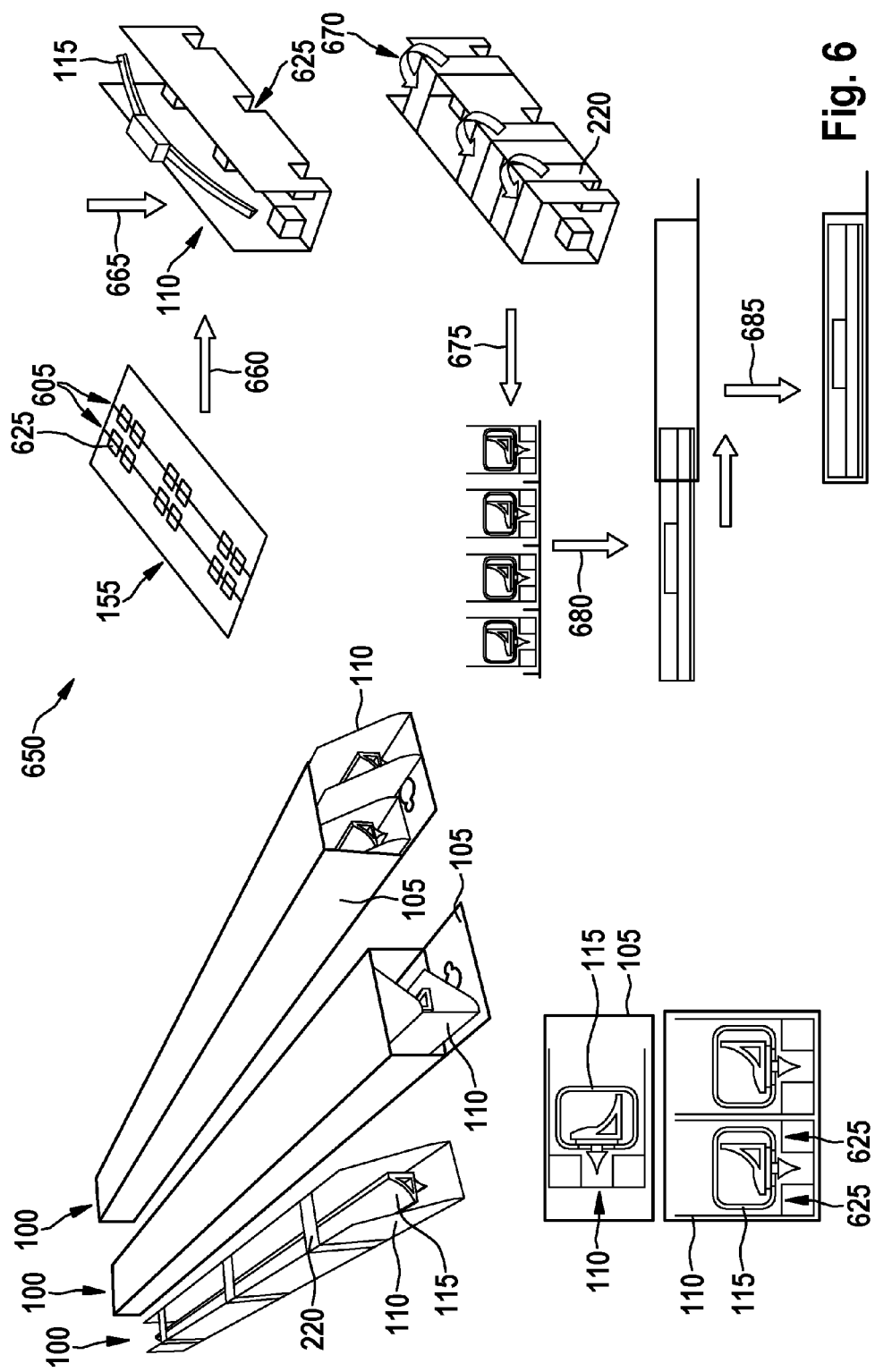
FIG. 6 shows a packaging for a wiper blade and a packaging method in a sixth embodiment.

FIG. 6 shows a packaging 100 and a method 650 for packaging a wiper blade 115 in the packaging 100 corresponding to a sixth embodiment.

The embodiment depicted resembles the second embodiment shown in FIG. 2 with the difference that the intermediate packaging 110 is a single piece and is also single ply in cross section. The intermediate packaging 110 can be produced from a rectangular plano 155. The intermediate packaging 110 is U-shaped in cross section and comprises two folds 605 that extend in the longitudinal direction. Support elements 625 are formed in the region of the folds 605, said support elements being folded out in a knee-shaped manner from the plano 155 towards the inner side of the intermediate packaging 110. The support elements 625 are set up to laterally support the wiper blade 115 at both sides of a narrow end.

The method 650 begins with a first step 660, in which the rectangular plano 155 is folded in a U-shaped manner in a single operational step and the support elements 625 are formed. Subsequently the wiper blade 115 is inserted from above into the U-shaped intermediate packaging 110 in step 665.

In a subsequent step 670, which corresponds to step 276 of the method 250 from FIG. 2, package bands 220 are attached in order to stabilize the wiper blade 215 in the intermediate packaging 110. The subsequent steps 675, 680, 685 correspond to the steps 580, 585, 590.

The invention claimed is:

1. A packaging (100) for a wiper blade (115), comprising:
    a cuboidal folding box (105); and
    an intermediate packaging (110) configured to receive the wiper blade (115) and configured to be received in the folding box (105),
    wherein the intermediate packaging (110):
        is produced by folding a planar material (155),
        has two parallel longitudinal sides (120, 130, 410) configured to abut against inner sides of the folding box (105), and
        comprises lateral support devices (125, 225, 425, 525, 625) configured to prevent the wiper blade (115) from tipping over in the intermediate packaging (110),
    wherein the intermediate packaging (110) has a cross section with opposing sides that converge, and
    wherein the cuboidal folding box (105) surrounds the intermediate packaging (110) along the entire longitudinal length of the intermediate packaging (110).

2. The packaging (100) according to claim 1, wherein the intermediate packaging (110) is open on a longitudinal side and comprises a package band (220) that surrounds the cross section.

3. The packaging (100) according to claim 1, wherein the intermediate packaging (110) comprises a first element (305) having a U-shaped cross section and a second element (310), the cross section of which comprises alternately vertical and horizontal sections and which is symmetrical with respect to a center section that abuts against the first element (305) between flanks thereof.

4. The packaging (100) according to claim 1, wherein a cross section of the intermediate packaging (110) has an M-shaped bottom section (405).

5. The packaging (100) according to claim 1, wherein the intermediate packaging (110) comprises prism-shaped contact faces (515) for ends of the wiper blade (115), wherein the contact faces (515) have in each case a V-shaped notch (520) for engaging the wiper blade (115).

6. The packaging (100) according to claim 1, wherein the intermediate packaging (110) is folded in a U-shaped manner in the longitudinal direction by means of two folds (605) and, in a region of the folds (605), angular support elements (625) are folded in each case towards an inside.

7. The packaging (100) according to claim 1, wherein the intermediate packaging (110) is configured to receive the wiper blade (115) on one longitudinal side (130).

8. The packaging (100) according to claim 1, wherein the folding box is configured to receive the intermediate packaging (110) containing the wiper blade (115) from a front face.

9. The packaging (100) according to claim 1, wherein the folding box (105) is configured to receive two intermediate packagings (110).

10. A packaged wiper blade comprising:
a wiper blade (115); and
a packaging (100) including
a cuboidal folding box (105); and
an intermediate packaging (110) containing the wiper blade (115) and received in the folding box (105);
wherein the intermediate packaging (110):
is produced by folding a planar material (155);
has two parallel longitudinal sides (120, 130, 410) abutting against inner sides of the folding box (105); and
comprises lateral support devices (125, 225, 425, 525, 625) preventing the wiper blade (115) from tipping over in the intermediate packaging (110), and
wherein the intermediate packaging (110) has a cross section with opposing sides that converge, and
wherein the cuboidal folding box (105) surrounds the intermediate packaging (110) along the entire longitudinal length of the intermediate packaging (110).

11. The packaged wiper blade (100) according to claim 10, wherein the intermediate packaging (110) is open on a longitudinal side and comprises a package band (220) that surrounds the cross section.

12. The packaged wiper blade (100) according to claim 10, wherein the intermediate packaging (110) comprises a first element (305) having a U-shaped cross section and a second element (310), the cross section of which comprises alternately vertical and horizontal sections and which is symmetrical with respect to a center section that abuts against the first element (305) between flanks thereof.

13. The packaged wiper blade (100) according to claim 10, wherein a cross section of the intermediate packaging (110) has an M-shaped bottom section (405).

14. The packaged wiper blade (100) according to claim 10, wherein the intermediate packaging (110) comprises prism-shaped contact faces (515) for ends of the wiper blade (115), wherein the contact faces (515) have in each case a V-shaped notch (520) for engaging the wiper blade (115).

15. The packaged wiper blade (100) according to claim 10, wherein the intermediate packaging (110) is folded in a U-shaped manner in the longitudinal direction by means of two folds (605) and, in a region of the folds (605), angular support elements (625) are folded in each case towards an inside.

16. The packaged wiper blade (100) according to claim 10, wherein the intermediate packaging (110) receives the wiper blade (115) on one longitudinal side (130).

17. The packaged wiper blade (100) according to claim 10, wherein the folding box receives the intermediate packaging (110) containing the wiper blade (115) from a front face.

18. The packaged wiper blade (100) according to claim 10, wherein the folding box (105) receives two intermediate packagings (110).

19. The packaging (100) according to claim 1, wherein the intermediate packaging (110) has a trapezoidal cross section.

20. The packaged wiper blade (100) according to claim 10, wherein the intermediate packaging (110) has a trapezoidal cross section.

21. The packaging (100) according to claim 1, wherein the cuboidal folding box (105) has four sides that are at least as long as the longitudinal length of the intermediate packaging (110).

22. The packaged wiper blade (100) according to claim 10, wherein the cuboidal folding box (105) has four sides that are at least as long as the longitudinal length of the intermediate packaging.

* * * * *